Feb. 19, 1952 W. M. BARRET 2,585,907
TRANSMITTING AND RECEIVING APPARATUS
FOR ELECTROMAGNETIC PROSPECTING
Filed June 26, 1947 5 Sheets-Sheet 1

Inventor
William M. Barret

By
A. F. Flournoy
Attorney

Feb. 19, 1952 W. M. BARRET 2,585,907

TRANSMITTING AND RECEIVING APPARATUS FOR ELECTROMAGNETIC PROSPECTING

Filed June 26, 1947 5 Sheets-Sheet 2

Inventor

William M. Barret

By A. F. Flournoy

Attorney

Inventor
William M. Barret
By
A. F. Flournoy
Attorney

Feb. 19, 1952

W. M. BARRET 2,585,907

TRANSMITTING AND RECEIVING APPARATUS
FOR ELECTROMAGNETIC PROSPECTING

Filed June 26, 1947

5 Sheets-Sheet 4

Inventor
William M. Barret

By
A. F. Flournoy
Attorney

Feb. 19, 1952 W. M. BARRET 2,585,907

TRANSMITTING AND RECEIVING APPARATUS FOR ELECTROMAGNETIC PROSPECTING

Filed June 26, 1947 5 Sheets-Sheet 5

Inventor
William M. Barret

By A. F. Flournoy
Attorney

Patented Feb. 19, 1952 2,585,907

UNITED STATES PATENT OFFICE 2,585,907

TRANSMITTING AND RECEIVING APPARATUS FOR ELECTROMAGNETIC PROSPECTING

William M. Barret, Shreveport, La., assignor to Engineering Research Corporation, Shreveport, La., a corporation of Louisiana Application June 26, 1947, Serial No. 757,242

2 Claims. (Cl. 250—17)

This invention relates to the art of electrical prospecting, and more particularly to an improved system for introducing electromagnetic energy into the earth and receiving it therefrom, the said system being especially adapted for use with the radio methods of prospecting.

The present application is a division of applicant's parent application for "Transmitting and Receiving Apparatus and Method for Electromagnetic Prospecting," Serial No. 483,638, filed April 19, 1943, now abandoned.

The transmitting and receiving antennas employed with the conventional radio methods of subsurface exploration have customarily followed the well-known types used for radio communication between widely spaced points on the earth's surface. It is recognized that in the communication art it is desirable that the electromagnetic radiation be propagated principally through the air, but that for radio prospecting it is an essential requirement that the radiation be transmitted into the earth and subsequently received therefrom. The problems and requirements of the two applications are therefore entirely different, and it is evident that the same type of radiating and receiving means would not be adapted to both communication work and radio prospecting.

Furthermore, the elevated transmitting and receiving antennas invariably used for radio communication, and ordinarily employed for subsurface exploration, are semipermanent structures that do not satisfy the portability requirements demanded by the radio-prospecting art.

The herein invention discloses transmitting and receiving means for electrical prospecting which overcome the defects inherent in the antenna systems formerly utilized.

One of the objects of the invention is, accordingly, to provide a novel and useful means for transmitting electromagnetic energy into the earth.

Another object of the invention is to furnish an effective means for receiving electromagnetic energy from the earth.

Another object is to make available an efficient transmitting means and receiving means for introducing electromagnetic energy into the earth and receiving it therefrom, whereby the said transmitting means and receiving means may be employed collectively to practice various radio-prospecting methods, or they may be used individually with conventional systems for radio exploration.

Another object is to provide transmitting and receiving means in portable forms that are adapted to the efficient transmission of electromagnetic energy into the earth and its reception therefrom.

Another object is to furnish a method of effectively introducing electromagnetic energy into the earth, and receiving it therefrom.

An additional object is to supply a method of utilizing the effective introduction of electromagnetic energy into the earth and its reception therefrom, whereby the said method may be practiced in accordance with the disclosures in the prior art.

A further object is to provide a method for the directive transmission of electromagnetic energy into the earth in any desired direction, and for the directive reception of the said energy from any desired direction.

Other objects of the invention will be apparent from a consideration of the description which follows, and the drawings appended thereto, wherein.

It has been the generally accepted belief that the radiation from an antenna is directly proportional to its height above the earth's surface, and radiation equations in good textbooks, for example: J. H. Morecroft, "Principles of Radio Communication," p. 883, John Wiley and Sons, Inc., New York (1933), indicate that no radiation would be obtained from an antenna having zero height. For this reason, radio-prospecting systems have in the past made use of some form of transmitting antenna which was supported at an appreciable height above the earth.

Figure 1:
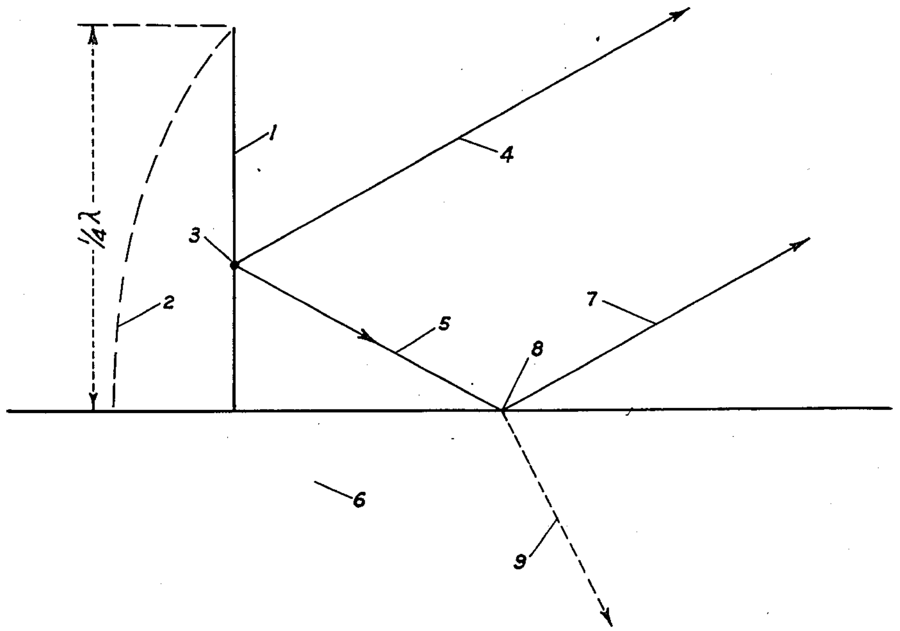
Fig. 1 illustrates diagrammatically the radiation from a vertical quarter-wave antenna whose base is positioned at an interface between air and earth.

A type of antenna not uncommon in radio prospecting is the quarter-wave vertical radiator 1 (Fig. 1), whose current distribution is indicated by the dashed curve 2. The field intensity at a distant point due to this antenna is the summation of the effect of each radiating element, such as element 3, which propagates a ray 4 direct to the said distant point, and a ray 5 which reaches the distant point after reflection from the earth 6. If the earth 6 were perfectly conducting, then all of the energy in the ray 5 would be reflected from the said earth, and would be present in the ray 7. Actually, however, the earth is only partially conducting, and consequently some of the energy in the ray 5 enters the earth 6 at the point 8, where it is refracted according to Snell's law in the direction of the arrow 9.

It is, of course, the refracted energy which enters the earth that is effective in the operation of radio-prospecting methods, and since the refracted component may constitute but a very small part of the energy radiated by the antenna 1, it is evident that this form of radiating system is inefficient and poorly adapted to the requirements of radio prospecting. This criticism applies not only to the quarter-wave vertical antenna shown in Fig. 1, but to all of the radiators customarily employed in prospecting work.

Careful research has developed the fact that a current-carrying element placed substantially in or below the air-earth interface is suitable for propagating electromagnetic waves for the moderate distances required in radio prospecting, and that the said current-carrying element so positioned will overcome the reflection loss at the earth's surface which characterizes the conventional transmitting antennas.

It has been found that the said current-carrying element may be either on insulated or a bare conductor of the proper form, and that it may be located either on the surface of the earth or buried therein.

The fact that a current-carrying element having substantially zero (or negative) height above the earth will propagate electromagnetic waves is a contradiction of the radiation equations referred to previously. The disagreement may be explained, however, by remembering that the said radiation equations are postulated on the propagation of energy through the air above the earth, and that the said current-carrying element, located substantially in or below the air-earth interface, results in an energization of the earth volume adjacent thereto, and the consequent transmission therefrom of electromagnetic energy through the earth.

In view of the particular function performed by the said current-carrying element positioned as here described, it shall henceforth in this specification be called at times an "energizer."

A number of important differences distinguish the said energizer from the conventional "air" antennas used in communication work and in radio prospecting. Attention already has been directed to one of the chief differences, that is, its location immediately adjacent to or within the earth, whereas the effective operation of conventional antennas requires that they be placed in the air, a considerable distance above the earth, and that their radiating portions be insulated carefully from the earth. Another distinction that has been pointed out, and one which is significant in radio prospecting, is that the said energizer concentrates in the earth the energy it transmits, while on the contrary the ordinary antennas concentrate their radiation in the air. The said energizer also exhibits directional characteristics that are vastly different from those of air antennas of similar form and proportions; for example: a half-wave horizontal antenna located in the air, and well removed from the earth, will radiate bidirectionally at right angles to its length, but a half-wave horizontal energizer, placed flat on the earth's surface, will "fire" bidirectionally along its length. Moreover, the half-wave air antenna will radiate horizontally polarized waves, while the energizer propagates vertically polarized waves. Still another difference is that the electrical proportions of the energizer must be predicated on the wave length of the transmitted waves in the earth, rather than on the length of the waves in free space, as is the case for antennas operating in the air, and well above the earth. This last difference frequently results in a great reduction in size for the energizer, as under some conditions the wave length in the earth may be less than one-fourth that in free space.

It is evident, therefore, that a conventional transmitting antenna, designed for operation in the air above the earth, will not perform its intended function if located substantially in or below the air-earth interface, nor will it be suitable for propagating electromagnetic waves into the earth until its essential characteristics are altered to conform to the energizer described herein.

Figure 2:
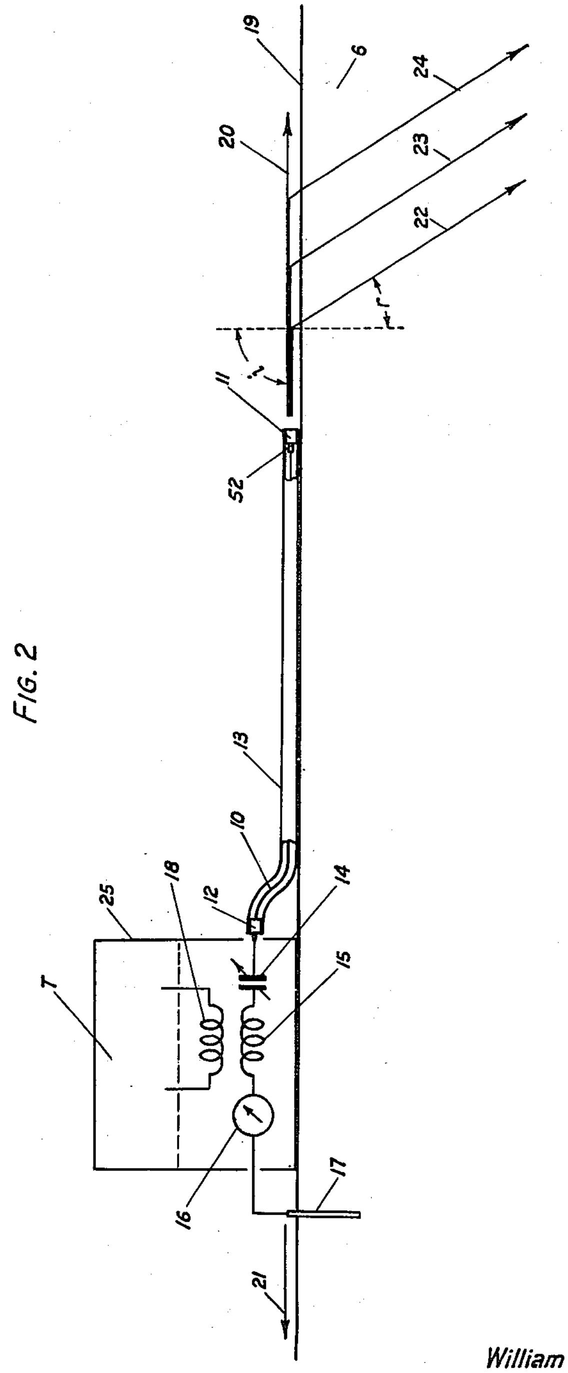
Fig. 2 shows a radio transmitter that is inductively connected to a circuit which includes an energizer placed substantially in an air-earth interface, the radiation from the said energizer impinging on the earth at approximately grazing incidence and being refracted therein.

One embodiment of the invention is illustrated in Fig. 2, where the insulated metallic conductor 10, which is held by the insulators 11 and 12 and insulated from the earth 6 by the covering 13, is connected to the variable condenser 14, thence through the inductor 15 and current-indicating meter 16 to the metallic ground rod 17. If the conductor 10 be of the proper length, and if the inductor 15 be excited by the radio transmitter T, for example, by inductive coupling with the coil 18, then the circuit which includes the conductor 10 may be made to resonate at the frequency of the transmitter's oscillations by adjusting the variable condenser 14 for maximum deflection of the meter 16.

When the said circuit is brought to resonance, the conductor 10 acts as a radiator of electromagnetic waves, and the radiations therefrom will be transmitted to some extent in practically all directions from the said conductor, but chiefly along its axis.

As the conductor 10, hereinafter termed the energizer 10, lies substantially in the air-earth interface 19, there is no appreciable reflection of the radiation at the said interface, and the energy is transmitted freely into the earth 6. However, as stated previously, most of the propagated energy is concentrated substantially along the axis of the said energizer, in the directions of the arrows 20 and 21, and it is this concentration of energy which serves the most useful purpose in the operation of the energizer illustrated.

Consider the arrow 20, which represents a bundle of electromagnetic waves moving to the right of Fig. 2. These waves impinge on the air-earth interface 19 at approximately grazing incidence, and hence (according to Snell's law) are refracted into the earth at an angle $r=\sin^{-1} 1/n$, where $n$ is the index of refraction of the earth material with respect to air. One of the refracted waves is represented by the line 22, and as the bundle of waves progresses in the direction of the arrow 20, additional waves "peel off" and enter the earth at grazing incidence (angle $i=90$ degrees), as indicated by the lines 23 and 24.

In view of the fact that a large part of the energy fired by the energizer 10 strikes the air-earth interface 19 at angles approximating grazing incidence, and because practically all such energy finally is refracted into the earth 6, it is evident that the system under discussion is a highly effective means for transmitting into the said earth a large proportion of the total energy propagated by the said energizer.

The preferred means for practicing the invention disclosed in Fig. 2 employs for the energizer 10 an insulated copper wire, for instance, a rubber-covered single-conductor stranded cable, whose length is approximately one-quarter the wave length (in earth) of the radiation used, and which is covered by a rubber tube having a wall thickness of about ⅛ inch. The said energizer is fastened to the low-loss insulator 11; passes through the similar insulator 12, and thence to the tuning components indicated, which are enclosed by the electromagnetic shield 25. The tube 13, which preferably is made substantially waterproof, is in ordinary practice placed flat on the earth's surface 19, and oriented to obtain maximum transmission in the desired direction.

Figure 7:
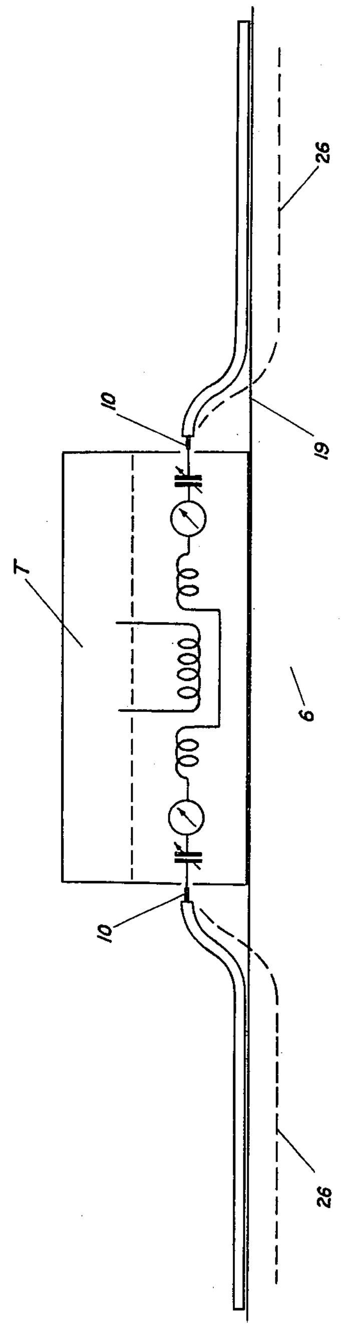
Fig. 7 illustrates a radio transmitter that is inductively connected to a circuit which includes two energizers placed substantially in an air-earth interface, or alternatively, below the said interface.

It will be obvious to those versed in the radio art that various modifications may be made in the preferred transmitting means here described without departing from the broad principle of the invention. For example, the energizer 10 may be a bare conductor of various sizes and shapes instead of the preferred insulated wire; the covering 13 may be dispensed with if the insulation on the said energizer is adequate, and in some instances it will be found satisfactory to use a bare conductor in intimate electrical contact with the earth 6; the said energizer may have various lengths, but preferably approximating quarter-wave-length multiples of the propagated waves, it being understood that an odd quarter-wave-length energizer should be current fed as shown in Fig. 2, but that an even quarter-wave-length energizer should be voltage fed when power is furnished at the end of the said energizer. The functional relations between the length of the energizer and its current and voltage distributions, radiation resistance, directivity and effectiveness as a radiator are consistent with established principles of radio engineering. Moreover, the said energizer may be buried beneath the air-earth interface 19, but when this mode of operation is used the energizer ordinarily is oriented substantially parallel to the said interface. Furthermore, the said energizer may be arranged in two (or more) parts with its associated transmitter located centrally thereto, and one (or more) of the said parts may be used to replace the ground rod 17, so that there is no metallic connection with the earth 6. An alternative arrangement of this kind is shown in Fig. 7, where the two similar conductors 10 are each quarter-wave (or other suitable length) energizers, placed flat on the ground surface 19, or buried within the earth 6 as indicated diagrammatically by the dashed lines 26. And finally, it will be understood that various forms of well-known coupling devices may be employed to connect the said energizer or energizers to the associated transmitter.

The fundamental principle involved in the invention is the provision of a radiating element or elements placed substantially in or below the air-earth boundary, and those skilled in the art will recognize that a multitude of variations may be used in practicing the invention. The quarter-wave-length horizontal insulated energizer 10 (Fig. 2), located on the ground surface 19, is the preferred means because it accomplishes the desired purpose with simple and effective apparatus, which is convenient to handle in practical field operations.

It will be understood that the length of the preferred quarter-wave energizer refers to the wave length in the earth of the propagated waves, and that the earth wave length is equal to the wave length in free space divided by the refractive index of the earth material in question with respect to air. The wave length in feet in free space is equal to $9.85 \times 10^8$ divided by the frequency in cycles per second, and for ordinary earth the index of refraction generally runs between about 1.25 and 3.00, which means that the respective velocity of the waves in the earth usually is between 0.80 and 0.33 that in free space. A quarter-wave energizer is one which has an electrical length approximating one-quarter the length of the radiated waves in the earth, it being remembered that the true length of the energizer 10 (Fig. 2) should be measured from its free end 52 to the ground connection 17, taking into account the fact that the condenser 14 has the effect of decreasing the electrical length of the said energizer, and that the inductor 15 has the effect of increasing the electrical length of the said energizer.

The electrical length of a given energizer, positioned on earth having particular electrical properties, may be determined experimentally in various well-known ways, for instance, by finding its current loops and nodes with an exploring coil connected to a sensitive current-indicating meter, or by locating its voltage loops and nodes by means of a suitable potential-measuring device, such as that described by A. Hund in his treatise entitled "High-Frequency Measurements," p. 391, McGraw-Hill Book Company, Inc., New York (1933).

As coincident current nodes and voltage loops, and coincident current loops and voltage nodes, will be found at intervals of one-half wave length along the energizer, it will be seen that the preferred quarter-wave energizer may be obtained by varying the length of the conductor 10 until a current loop and voltage node appear at the ground connection 17 and a current node and voltage loop are present at the free end 52 of the said conductor. The adjustment for length of the energizer preferably is made with the condenser 14 set near its midscale position (and substantially canceling the reactance of the coil 15), so that the length so determined may be used in various localities, having different types of earth, without exceeding the tuning range of the said condenser.

The specification thus far has directed attention to means for and a method of efficiently transmitting electromagnetic energy past the air-earth interface and into the earth. After the said energy penetrates the said earth, it may perform a number of useful functions, evidence of which is the character of the energy which subsequently is returned to the air-earth interface. The effective reception of the returned energy is, therefore, essential for the proper recognition of the subsurface conditions involved. It will be understood from what follows that the conventional receiving means used with the presently disclosed radio-prospecting methods are subject to serious limitations in their reception of electromagnetic waves that emerge from the earth.

Figure 3:
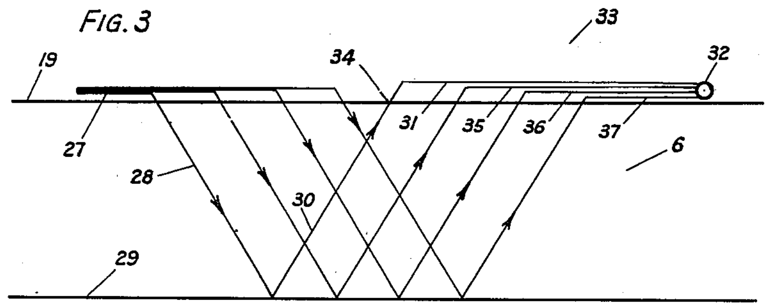
Fig. 3 is a schematic diagram displaying the reflection of electromagnetic waves at a subsurface reflector lying parallel to the air-earth interface, when the said waves enter the earth at substantially grazing incidence.

Line 27 of Fig. 3 represents a group of electromagnetic waves propagated by a suitable mechanism, for illustration, the energizer 10 shown diagrammatically in Fig. 2. The waves move from left to right and strike at substantially grazing incidence the air-earth interface 19, where they are refracted into the earth 6, as indicated by the ray 28. If the refracted waves impinge on the horizontally disposed reflector 29, which may be the top of a porous formation carrying salt water, then they will be reflected as indicated by the ray 30 to the said air-earth interface 19, and thence refracted as shown by the ray 31. Radio-prospecting systems customarily embody a receiving means that is excited by an antenna, for example, the loop antenna 32, which is located in the air 33, a substantial distance above the interface 19. An electromagnetic field is associated with the ray 31, and this field will induce a voltage in the loop 32, and cause a current to flow therein, provided the said loop is located to the right of the point of emergence 34, and within the range of the wave source. Investigation will show that all of the rays that emerge from the earth 6 and finally reach the loop 32, for instance, rays 35, 36 and 37, have the same space phase and the same time phase at the said loop, and hence there is a distinct reinforcing action at the said loop.

Figure 4:
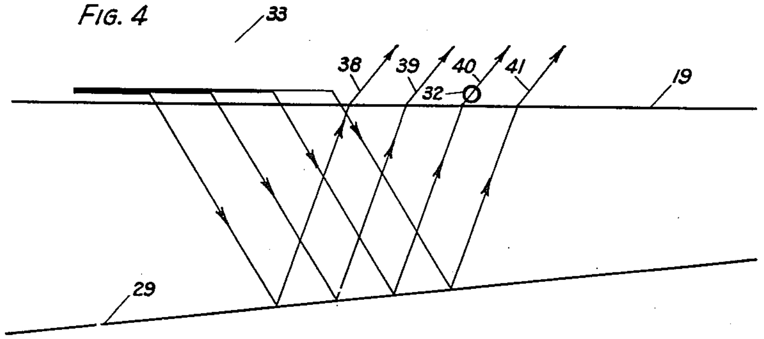
Fig. 4 is a schematic diagram displaying the reflection of electromagnetic waves at a subsurface reflector that is inclined downward toward the wave source, when the said waves enter the earth at substantially grazing incidence.

Suppose, however, that the reflector 29 is tilted as shown in Fig. 4, and the emergent rays are not refracted parallel to the interface 19, but along the lines 38, 39, 40 and 41. It will be seen that in this case the only refracted rays that are effective in causing a current to flow in the loop 32 are those rays which happen to strike the said loop. All rays that emerge to the right or left of the said loop remain undetected. For the case here cited, it is, accordingly, only a very small part of the emergent energy that is effective in the operation of a receiving means which is energized by any type of portable antenna that is placed in the air 33, above the interface 19.

Figure 5:
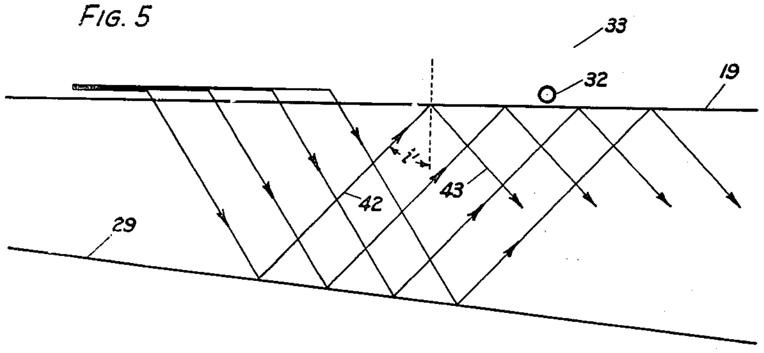
Fig. 5 is a schematic diagram displaying the reflection of electromagnetic waves at a subsurface reflector that is inclined upward toward the wave source, when the said waves enter the earth at substantially grazing incidence.

Furthermore, if the reflector 29 be disposed as illustrated in Fig. 5, then the angle of incidence $i'$ of the reflected waves (for example, the wave represented by the ray 42) on the air-earth interface 19 will exceed the critical angle, $i'=\sin^{-1} 1/n$, and the said waves will be totally reflected at the said interface, as indicated by the ray 43. In this case there can be no emergent waves, and hence a receiving means that is excited by any form of antenna placed in the air 33, a substantial distance above the interface 19, will not prove effective in detecting the energy returned to the ground surface by the reflector 29.

The three cases here referred to cover broadly the principal applications of the radio methods, and it is seen that the conventional receiving means are adapted to the solution of but one of the cases, namely, that which involves a reflector or reflectors lying substantially parallel to the air-earth interface, and the emergence of waves that are refracted substantially parallel to the said interface.

It will be understood from what follows that the herein disclosed invention may be effectively applied not only in the transmission of electromagnetic waves into the earth, but also in their reception therefrom, and when so applied, the invention makes possible the detection of all waves arriving from depth at the air-earth interface, regardless of their angles of incidence thereon.

Figure 6:
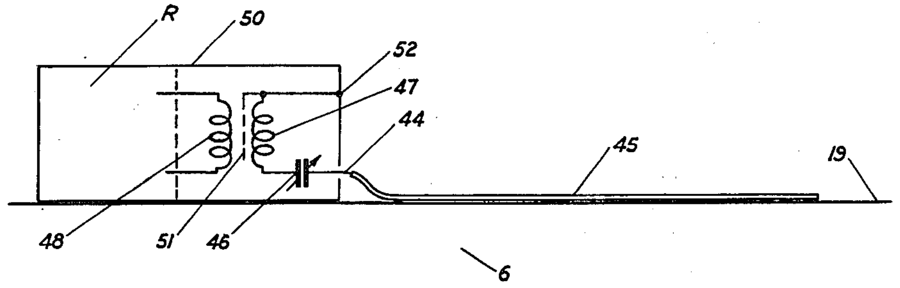
Fig. 6 shows the input circuit of a radio receiver that is excited by a pickup lying substantially in an air-earth interface.

In Fig. 6 is illustrated a metallic conductor 44, covered by the insulating sheath 45, which is placed flat on the ground surface 19, and connected through the variable condenser 46 to one end of the primary 47 of a radio-frequency transformer, the secondary 48 of which is tied to the input of the receiver R, enclosed by the electromagnetic shield 50. The electrostatic shield 51, which is located between the primary 47 and secondary 48 of the said transformer and connected at 52 to the shield 50, insures that only electromagnetic coupling is effective in transferring energy from the said primary to the said secondary.

When the conductor 44 and its associated circuit is tuned to resonance by the variable condenser 46, a radio wave moving in either direction along the said conductor will cause a current to flow therein, and the said current may be fed into any suitable receiving means, such as the receiver R, whose output may be passed through an amplifier and indicated or measured by a meter or other suitable means. As will be shown hereinafter, the conductor 44 has good directive discrimination, its receptiveness being greatest for a wave moving along its length and least for a wave moving at right angles thereto. Positioned substantially in (or below) the air-earth interface 19, the said conductor is suitable for the reception of waves traveling parallel to the said interface, as illustrated in Fig. 3, and waves that arrive from depth and strike the said interface at various angles of incidence, such as indicated in Figs. 4 and 5. The conductor 44 therefore performs the function of "picking up" electromagnetic waves that arrive at the air-earth interface 19 from any direction, and because of its particular function the said conductor shall be referred to at times in what follows as a "pickup." The intensity of the signal reaching the receiver R generally will be increased if the shield 50 is connected to the earth 6 by a ground rod driven into the said earth, but in practice this is an inconvenience which usually is unnecessary, and for ordinary operations it will be found that satisfactory results may be obtained with the receiver R, and its associated shield 50, placed on the ground surface 19, or even elevated an appreciable distance therefrom.

The receptiveness of the pickup 44 also varies with its length, becoming progressively greater up to an electrical length equal to one-quarter the length (in earth) of the received waves. Lengths in excess of one-quarter wave usually are difficult to handle in field operations; result in little improvement over the performance of the quarter-wave pickup, and require no further consideration here.

The preferred means for using the herein invention for the reception of electromagnetic waves depends somewhat on the wave length of the radiation involved, on the power radiated by the associated transmitter, and on the sensitivity of the receiver. It has been found satisfactory in practice to employ a rubber-covered single-conductor stranded cable for the pickup 44 of Fig. 6, and to make the length of the said cable approximately one-quarter the length (in earth) of the received waves. Should this lead to a length that is difficult to use in the field, then it usually can be reduced to a convenient size without seriously impairing the effectiveness of the invention. Aside from differences in the coupling means ordinarily employed, it is seen that the preferred form of pickup (Fig. 6) is quite similar in its essential characteristics to the preferred form of energizer (Fig. 2). With the latter, however, it is usually desirable to provide more effective insulation about the conducting element, particularly near its free end 52, where high voltage may be present.

It will be evident to those familiar with radio practice that alternative arrangements of the receiving means may at times be employed to advantage. For instance, with some kinds of earth material the pickup 44 may consist of a bare wire, of various sizes and lengths, which makes intimate electrical contact with the adjacent earth 6. Moreover, the said pickup may be buried in the said earth below the ground surface 19, and ordinarily parallel thereto, instead of being placed above the said surface as indicated in Fig. 6. Alternatively, the receiving means may be a double-ended system, as illustrated in Fig. 8, which comprises two (or more) similar quarter-wave-length (or other suitable length) conductors 44, extending in substantially opposite directions from the receiver R, and the said conductors may be located on the ground surface 19, or they may be buried in the earth 6 as shown diagrammatically by the dashed lines 53.

Various other modifications will occur to those skilled in the radio art without deviating from the basic principle involved in the herein invention, namely, the provision of a receiving element or elements placed substantially in or below the air-earth interface, so as to furnish an effective means for the detection of electromagnetic waves that arrive from depth at the said interface, irrespective of the paths traveled by the said waves.

Figure 8:
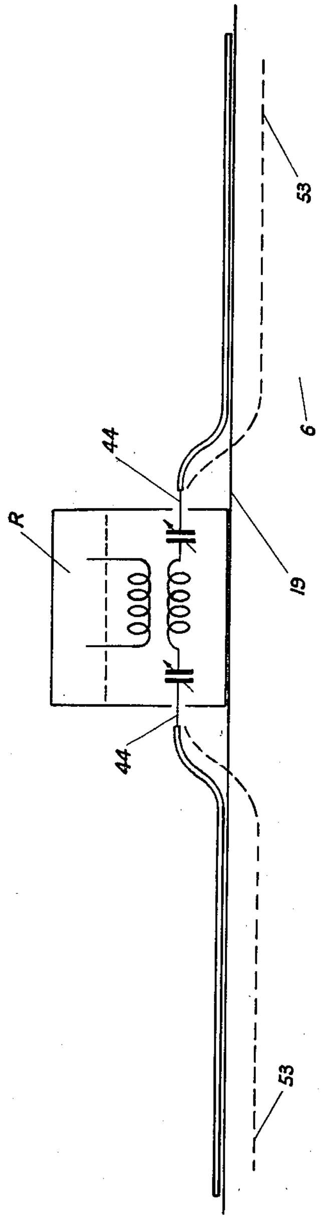
Fig. 8 illustrates the input circuit of a radio receiver that is excited by two pickups lying substantially in an air-earth interface, or alternatively, below the said interface.

One end of the buried energizers 26 of Fig. 7 and one end of the buried pickups 53 of Fig. 8 are brought above the earth's surface 19 for connection with the respective transmitting means T and receiving means R. This is done ordinarily as a matter of convenience in practice, and for the sake of simplification in the drawings. It should be understood, however, that an energizer or pickup may be operated when completely enclosed within the earth, with its associated transmitting means or receiving means likewise buried, or connected by suitable coupling devices and transmission lines to transmitting means or receiving means positioned on or above the earth's surface. The last-mentioned procedure is, of course, the preferable arrangement in the case of a deeply buried energizer or pickup, whether a single-ended or double-ended system is used.

It should not be inferred that the energizer or pickup disclosed herein must necessarily embody a linear conductor or conductors as illustrated by the accompanying drawings, for it is evident that other forms of transmitting and receiving elements may be used in practicing the invention; for instance, the said transmitting and receiving elements may comprise a conductor (or conductors) wound in the form of a loop (or loops), and the said loop may be used in accordance with the herein disclosures if it be placed substantially in or below the air-earth interface, with its plane preferably parallel to the direction of the outgoing or incoming waves.

Preferred forms of the energizer and pickup now have been described, and alternative means for practicing the invention have been suggested. In each case, however, it has been indicated that in the preferred mode of operation the said energizer and pickup are placed substantially parallel to the air-earth interface, so that the propagated energy is transmitted into the earth and received therefrom principally at grazing incidence.

One should recognize, nevertheless, that the said energizer and pickup may be oriented in the earth in directions other than parallel to its surface, and when so oriented they provide a means for directing electromagnetic energy into the earth, and receiving it therefrom, in directions other than substantially parallel to the air-earth interface.

For example, the radiation from an energizer may be directed into the earth in various and arbitrary directions by the simple expedient of positioning the said energizer in a bore hole (or other suitable opening) that is drilled or otherwise formed in the said earth at the proper angle therein.

It is obvious that the same principle may be applied with equal facility to the pickup described in this specification, and when so applied the invention provides a means for the reception of electromagnetic energy returning in various directions from depth in the earth.

The combination of a buried energizer and a buried pickup, whose mutual spatial relation can be chosen to meet particular requirements, may sometimes be used advantageously in the investigation of certain subsurface problems where it is desirable to emphasize the reception of waves from a particular reflector lying at a particular depth, and thereby discriminate against the reflections that arise from shallower or deeper reflectors. This procedure clearly will simplify the character of the response indicated by the receiving means, and make more reliable an interpretation of the subsurface conditions postulated on the said response.

The energizer-pickup combination here described may be incorporated in the apparatus embodied in various systems for exploring the geologic section with electromagnetic waves, for instance, in the system set forth in applicant's copending application Serial No. 383,770, filed March 17, 1941, Patent No. 2,426,918, granted September 2, 1947 entitled "Means and Methods for Electromagnetic-Wave Investigations." When used with applicant's said system, it is to be understood that the lengths of the energizer and pickup are varied in accordance with the frequency of the transmitted waves so that the said lengths bear at all times an appropriate and substantially constant ratio to the lengths in earth of the radiated waves.

An important characteristic of the simple energizer considered thus far in this specification is the fact that it radiates bidirectionally, that is, the principal energy is transmitted about equally in the directions of the arrows 20 and 21 of Fig. 2. Although this feature is sometimes an advantage for certain applications, yet in other cases it is preferable that the radiation be unidirectional, so that the energy is concentrated in one or the other direction.

Figure 9:
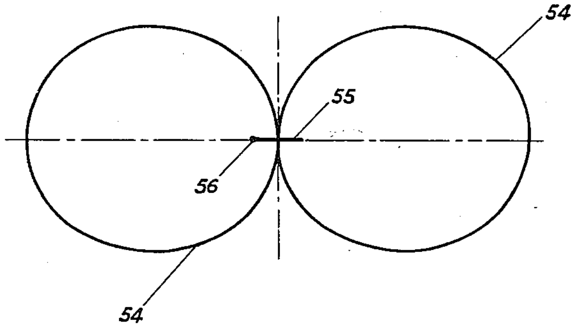
Fig. 9 is a diagram that exhibits the bidirectional horizontal radiation pattern of a quarter-wave insulated energizer placed flat on the earth's surface.

The preferred method of obtaining unidirectional transmission will be apparent from a consideration of what follows. In Fig. 9 appears the bidirectional horizontal radiation pattern 54 associated with a single quarter-wave insulated energizer 55, placed flat on the earth's surface and grounded at the point 56. For simplicity, the tuning components, resonance-indicating means and coupling device, which usually are included in the energizer circuit, have been omitted in the drawing. Worth noting at this point is the fact that the horizontal "reception pattern" of a single quater-wave insulated pickup, located flat on the earth's surface, has essentially the same configuration as the radiation pattern 54 of Fig. 9.

Figure 10:
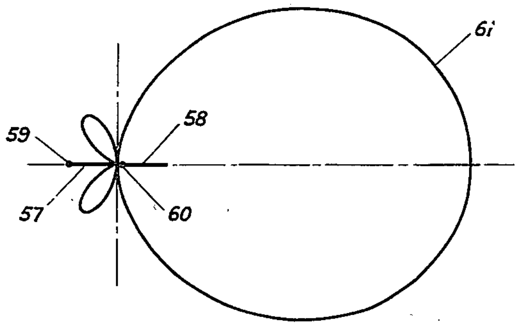
Fig. 10 is a diagram that exhibits the substantially unidirectional horizontal radiation pattern of two collinear quarter-wave insulated energizers placed flat on the earth's surface and excited with currents 90 degrees out of phase.

Now, if two collinear quarter-wave insulated energizers 57 and 58 be disposed on the earth's surface as shown in Fig. 10, with their ground connections 59 and 60 separated substantially a quarterwave length (in earth), the unidirectional horizontal radiation pattern 61 will be developed when the current supplied the energizer 57 leads the current in the energizer 58 by 90 degrees. The energizer 57 thus acts as a driven reflector, which cuts out the lobe to the left of Fig. 9, and makes the combination substantially unidirectional. If the phase of the current in 58 were 90 degrees ahead of the current in 57, then the two collinear energizers would remain unidirectional, but would fire in the opposite direction. In this case, as with other multiple-element energizer arrays, each element may be fed by a low-impedance transmission line which derives its power from a conventional type of phase-shifting network.

Figure 11:
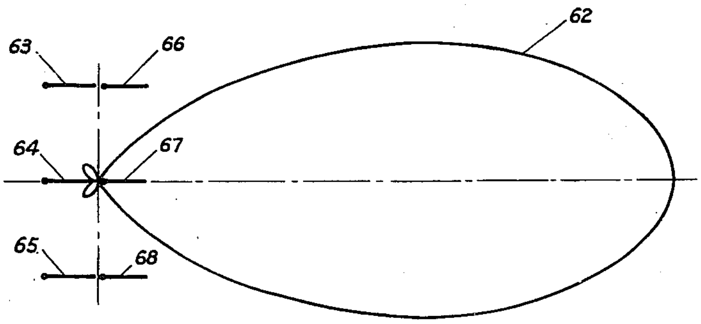
Fig. 11 is a diagram that exhibits the substantially unidirectional horizontal radiation pattern of three pairs of collinear quarter-wave insulated energizers placed flat on the earth's surface and excited with currents having particular phase and amplitude relations.

The radiation pattern of Fig. 10 can be made more directional by the addition of a driven director to the right of the element 58, or preferably, by adding broadside pairs of collinear quarterwave energizers, such as the three similar pairs illustrated in Fig. 11, where the spacing between pairs is made substantially one-half wave length. The unidirectional horizontal lobe 62 is obtained when the energizers 63, 64 and 65 are furnished currents of the same phase, but 90 degrees ahead of the respectively like currents in the collinear energizers 66, 67 and 68, and the currents in the center pair of energizers are made twice the magnitude of those in the outside pairs. The directivity of the array may be increased by the addition of broadside elements.

It should be stated here that the radiation patterns of Figs. 9, 10 and 11 are based on the assumption that equal amounts of power are supplied in each case to the energizer system, regardless of the number of elements embodied in the said system.

From the foregoing it will be evident to one familiar with directive arrays that unidirectional radiation patterns of substantially any configuration can be secured by various combinations of energizers, whose arrangement, number, lengths, spacing, phasing and currents, as well as their types (insulated or uninsulated) and depth of burial, are chosen properly to meet the requirements of the problem. A proper choice of the variables here set forth also makes it possible to change the direction of maximum propagation of the energizer system.

Owing to the reciprocity relation that exists between the radiating and receiving characteristics of directive arrays, it will be found that pickups may be used in the arrays hereinabove discussed instead of energizers, so as to greatly emphasize the reception of waves that arrive from a particular direction. It will also be found that the reception pattern of a given array of pickups will be substantially the same as the radiation pattern of the same array of energizers, and that the pickup array and energizer array will respectively receive and radiate most effectively along the same wave path.

Earlier in this specification a mode of operation was described which involved the positioning of an energizer and/or a pickup at arbitrary angles within the earth, so as to control the direction of propagation and/or reception of waves therewithin. With further reference to this mode of operation, it will be clear that a unidirectional array of energizers may be substituted for the single energizer specified; that a unidirectional array of pickups may be used to replace the single pickup mentioned previously, and that the combination of the energizer array and the pickup array will greatly improve the directive characteristics and functioning of the system discussed. When considering the application here referred to, one should remember that the direction of maximum propagation of an energizer array, and the direction of maximum reception of a pickup array, may be varied in ways other than by changing the orientation of the array in question. For example, with the buried arrays under discussion, the directions of maximum propagation and reception may be varied over a considerable range by a proper phasing of the currents flowing in the array elements. This can often be of practical significance with buried arrays, whose radiating and receiving characteristics may be adjusted to meet particular operating conditions without changing the elements or their positions in the earth.

It will be clear that an energizer system may comprise multiple elements, some of which are positioned above those lying substantially in or below the air-earth interface, and that a combination of this kind makes it possible to vary in a vertical plane the radiation pattern and the direction of maximum wave propagation, thereby providing an alternative means for securing vertical directivity without the necessity of placing the energizer array in bore holes (or other openings) in the earth. A combination of the type here referred to may comprise one or more "radiating" elements and one or more parasitic or driven reflecting and/or directing elements, and the said combination may be used not only for the directional transmission of electromagnetic waves into the earth, but also for the directional reception of waves returning to the surface from depth in the earth. The theory, design and construction of directive transmittting and receiving systems are treated comprehensively in many textbooks and other publications, and therefore it is unnecessary to consider here the detailed application of such systems in terms of the herein invention, other than to state that either the entire energizer or pickup structure is placed within the earth, or not less than the lowermost element or elements of the said structure are positioned substantially in or below the ground surface which constitutes the air-earth interface.

When parasitic reflectors and/or directors are employed with any of the energizer arrays referred to herein, it is to be remembered that the said arrays can be made to function when only one of the "radiating" elements is excited by a power source, since the reflectors and directors will be energized by wave excitation. And in like manner, a pickup array embodying parasitic reflectors and/or directors can be operated when only one of its "receiving" elements is connected to a receiving means.

It should be emphasized here that while the preferred transmitting and receiving means disclosed in the specification and drawings make use of resonant elements placed substantially in or below the air-earth interface, nevertheless, the said means will also function if operated in a non-resonant condition. The effectiveness of the said means is greatly improved, however, when the said elements are made resonant to the frequency of the electromagnetic energy involved.

The preferred form of radiating means shown in Fig. 2 propagates vertically polarized waves, which is the most effective polarization for transmission into the earth, and the preferred form of receiving means illustrated in Fig. 6 receives either vertically or horizontally polarized waves, or, in fact, waves that are polarized in any direction. This feature of the said receiving means adapts it to the requirements of almost any radio-prospecting method, whether or not it be employed in conjunction with the transmitting means disclosed herein. Furthermore, the said transmitting means may be used with other types of receiving means, provided they are adapted to the reception of vertically polarized waves. The transmitting and receiving means described in this specification may therefore be incorporated individually with other radio-prospecting apparatus, or they may be used collectively in practicing various radio methods of exploration.

For example, an energizer, or an appropriate combination of energizers, may be employed to propagate the electromagnetic energy delivered by the transmitter embodied in the geophysical system disclosed in applicant's U. S. Patent No. 2,172,688, issued September 12, 1939, under the title "Electrical Apparatus and Method for Geologic Studies," and the said energy may be received with the loop antenna described in the aforesaid patent. Moreover, the pickup disclosed herein, or a combination thereof, may be used instead of the said loop antenna for receiving the waves radiated by the air antenna disclosed in the said patent. Alternatively, the said air antenna and loop antenna may both be replaced by the combination of an energizer and pickup, which thereby provide an effective means for practicing the method set forth in the said patent.

From what has gone before it will be readily apparent that when the transmitting means and the receiving means disclosed herein are used in conjunction with one another, they form a complete and improved system for effectively propagating electromagnetic energy into the earth and receiving it therefrom. As this is the fundamental requirement of most radio-prospecting techniques, it will be understood that the said system may be used advantageously in practicing a large number of the radio methods described in the art and literature.

In the preceding discussion, and in the claims to follow, it is indicated that electromagnetic energy is transmitted from an energizer in the form of electromagnetic waves, or more restrictedly as radio waves (unmodulated or modulated, continuous or interrupted), and that the said energy is received in the same form by a pickup. It is not intended, however, to limit the operation of the said energizer or pickup to the respective transmission and reception of electromagnetic waves, or radio waves, for it is recognized that the said operation may be postulated on the use of other forms of electric-energy flow, for example, on electric currents and pulses. Wave transmission and reception should not therefore be regarded as the only operative mechanism, but rather the preferred mechanism.

It is to be understood that the apparatus and methods disclosed herein are susceptible of various modifications without departing from the spirit and broad principles of the invention, and accordingly it is desired to claim all novelty inherent in the invention as broadly as the prior art permits.

What is claimed as new and useful is:

1. An energizer for transmitting electromagnetic waves into the earth comprising an elongated conductor which is insulated along its complete length and which is placed substantially in the air-earth interface, an adjustable condenser and an inductor connected in series with each other and with said conductor, a resonance indicator coupled to said energizer, a source of radio frequency waves of a predetermined frequency, and means for coupling said source to said inductor so that said energizer is current fed, the length of said elongated conductor being fixed at substantially an odd multiple of one-quarter wave length in the earth of the wave of said predetermined frequency, said adjustable condenser and inductor being adapted to vary the electrical length of said conductor.

2. An energizer for transmitting electromagnetic waves into the earth comprising two elongated conductors of equal length and having adjacent ends, said conductors being placed substantially in the air-earth interface, a series circuit comprising in the order named a variable condenser, at least one inductor and a second variable condenser connected between said adjacent ends, a resonance indicator coupled to said energizer, a source of radio frequency waves of a predetermined frequency, and means for coupling said source to said inductor so that said energizer is current fed, the length of each of said elongated conductors being fixed at substantially an odd multiple of one-quarter wave length in the earth of the wave of said predetermined frequency, said variable condenser and inductor being adapted to vary the electrical length of said conductors.

WILLIAM M. BARRET.

REFERENCES CITED

The following references are of record in the file of this patent:

UNITED STATES PATENTS

| Number | Name | Date |
|---|---|---|
| 1,220,005 | Rogers et al. | Mar. 20, 1917 |
| 1,303,730 | Rogers | May 13, 1919 |
| 1,322,622 | Rogers et al. | Nov. 25, 1919 |
| 1,349,103 | Rogers | Aug. 10, 1920 |
| 1,530,129 | Loftin et al. | Mar. 17, 1925 |
| 1,557,049 | Hammond | Oct. 13, 1925 |
| 2,333,990 | Dorne | Nov. 9, 1943 |